(No Model.)
A. L. HOLLANDER.
DUST PAN.
No. 504,474. Patented Sept. 5, 1893.
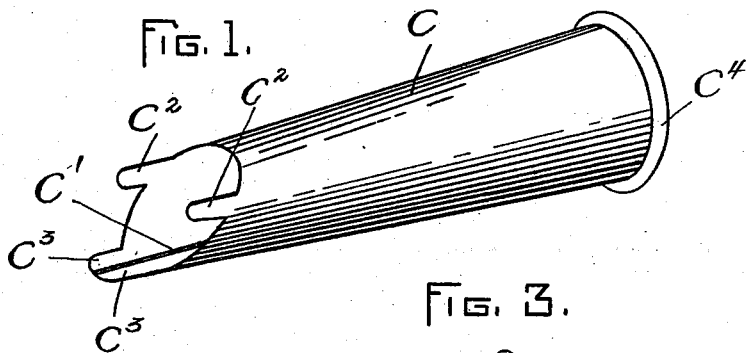
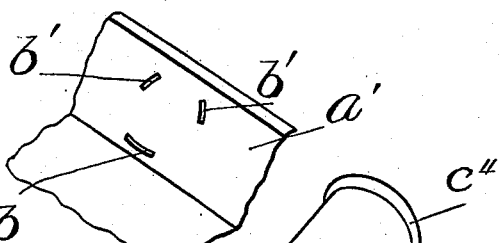
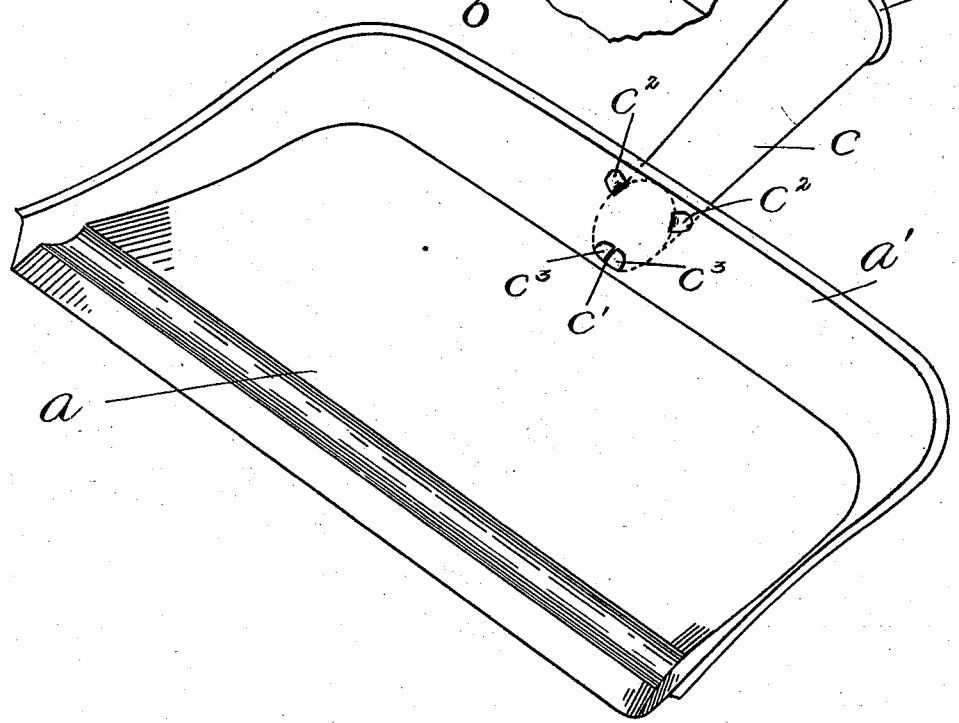

UNITED STATES PATENT OFFICE.

ALVA L. HOLLANDER, OF MILLIS, MASSACHUSETTS.

DUST-PAN.

SPECIFICATION forming part of Letters Patent No. 504,474, dated September 5, 1893.

Application filed May 11, 1893. Serial No. 473,834. (No model.)

*To all whom it may concern:*

Be it known that I, ALVA L. HOLLANDER, of Millis, in the county of Norfolk and State of Massachusetts, have invented certain new and useful Improvements in Dust-Pans, of which the following is a specification.

This invention relates to an improvement in dust-pans, and the object is to provide an improved metal fastening for connecting the handle with the pan, in which no solder is necessary and no separate fastenings.

To this end, the invention consists in the novel features of construction and combinations of parts hereinafter described and claimed.

The invention is illustrated by the accompanying drawings, of which—

Figure 1 shows a perspective view of the handle as it appears before being attached to the pan. Fig. 2 shows a perspective view of the complete pan. Fig. 3 shows a fragment of the pan, illustrating the form and arrangement of slots therein.

The same letters of reference indicate the same parts in all the figures.

The pan proper has the usual form, and comprises a bottom portion $a$ and a back portion $a'$. In the latter are formed a plurality of slots, in the present instance three, which are designated $b$ and $b'$. The slot $b$ is at the lower part of the back portion $a'$, near the bottom $a$, while the two slots $b'$ are near the upper edge of said back portion $a'$ and are located in juxtaposition. The slot $b$ is located centrally with respect to the slots $b'$, and is of greater extent than either of said slots $b'$.

The handle $c$ is tubular in form, and divided along its lower side, as shown at $c'$. At its inner end the handle is beveled, to fit against the outer side of the back portion $a'$ of the pan, and is formed with a number of tangs, which project from the inner end of the handle, and, before the handle is attached to the pan, are substantially parallel with each other, so that they may be inserted simultaneously in said slots. Two of these tangs $c^2$ are adapted to engage the two slots $b'$, which are slightly curved to properly receive the tangs; and the other two tangs $c^3$ are formed on opposite sides of the division $c'$, and are both adapted to engage the slot $b$. The handle is applied to the pan by inserting the tangs through the slots, and all the tangs are then bent over against the inner side of the pan, the two tangs $c^2$ being bent outward and the tangs $c^3$ being bent inward.

It will be seen that, besides forming a secure metal seam between the handle and pan, the construction above described provides for closing the tubular handle without the use of solder. The engagement of the tangs $c^3$ with the single slot $b$ closes the tubular handle at the inner end, while a cap $c^4$ is fitted over the outer end of the handle and closes it at that end. By dispensing altogether with solder in forming the seams in the pan, the latter is adapted to successfully undergo the process of enameling.

Having thus described my invention, what I claim as new, and desire to secure by Letters Patent, is—

1. A dust-pan, comprising in its construction the pan proper whose back portion is provided with a plurality of slots, and a tubular handle having tangs forming continuations of the tube and projecting from one end thereof, said tangs extending through the said slots and being bent in different directions over the inner side of the pan, so that they positively secure or lock the handle to the pan, the tangs being originally substantially parallel with each other, so that they may be inserted simultaneously in said slots by an endwise movement of the handle, as set forth.

2. A dust-pan, comprising in its construction the pan proper whose back portion is provided with a plurality of slots, and a tubular handle divided longitudinally along its lower side and provided with tangs engaging the said slots and bent over the inner side of the pan, two of said tangs being at opposite sides of the division in the handle and both engaging the same slot.

In testimony whereof I have signed my name to this specification, in the presence of two subscribing witnesses, this 6th day of May, A. D. 1893.

ALVA L. HOLLANDER.

Witnesses:
F. PARKER DAVIS,
ARTHUR W. CROSSLEY.